Patented Sept. 30, 1941

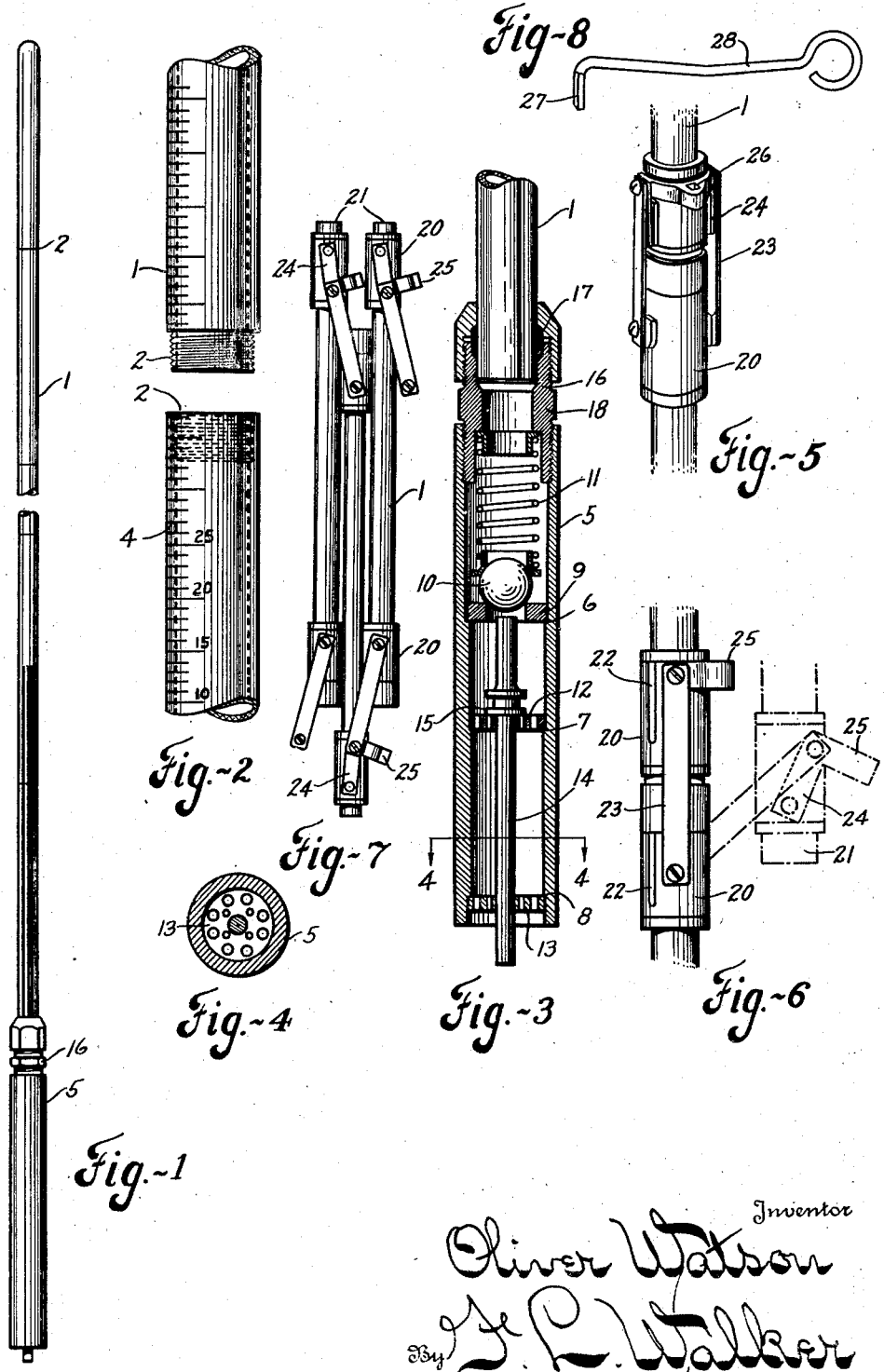

2,257,357

UNITED STATES PATENT OFFICE 2,257,357

ULLAGE ROD

Oliver Watson, Dayton, Ohio, assignor of one-half to Bert F. Downey, Springfield, Ohio Application March 6, 1939, Serial No. 260,042

4 Claims. (Cl. 33—126.4)

This invention pertains to liquid level gages or ullage rods, and more particularly to a gage of the "pipette" type wherein a body of liquid is trapped at the existing level, and is especially adapted for measuring contents of large storage tanks.

Various devices have been employed for measuring the contents of storage reservoirs such as oil tanks in the production fields and gasoline storage tanks at refineries or distribution points, the most common of which is a tape line with a weight attached. Such tanks are too deep for convenient measurement by use of a graduated pole manipulated by an operator standing on top the tank and which must be extended full length into the air preparatory to insertion and upon removal. In either event the "wet line" is rather indistinct and is read with difficulty after several measurements of different tanks have been taken.

To overcome these difficulties the present gage is of sectional construction comprising a succession of joints or lengths to be detachably interengaged as the gage is lowered into the tank and subsequently progressively detached from each other as the gage is withdrawn. The detachably engageable lengths or joints of the gage are tubular and graduated. The terminal member is valved to permit entry of liquid and operative to trap a portion thereof at a level corresponding to that of the tank.

The object of the invention is to improve the construction as well as the mode of use of liquid gages whereby they may not only be economically manufactured, but will be more efficient in use, automatic in operation, uniform in action, convenient for use in restricted spaces, and unlikely to get out of repair.

A further object of the invention is to provide a gage which may be conveniently manipulated on top of a large storage reservoir and which will make unnecessary the projection of a gage device high in the air above the operator in inserting and removing it from the tank.

A further object of the invention is to provide a sectional or extendible gage which may be readily adapted to different size tanks.

A further object of the invention is to provide a tubular gage of translucent non-fragile material which may be conveniently handled without danger of breakage.

A further object of the invention is to provide a gage comprising multiple detachable lengths or joints.

A further object of the invention is to provide improved detachable connections between successful joints.

A further object of the invention is to provide an improved trapping valve for the intake end of a tubular gage.

A further object of the invention is to provide a collapsible gage wherein detachable joints are held in assembly.

A further object of the invention is to provide flexible interconnecting means between successive joints of a gage tube by which the tube may be folded into compact form.

A further object of the invention is to provide an improved tightening means for forcibly interconnecting successive detachable tubular joints in leak-tight relation.

A further object of the invention is to provide a liquid gage having the herein mentioned advantageous structural features and meritorious characteristics.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the accompanying drawing, wherein is shown the preferred but not necessarily the only form of embodiment of the invention, Fig. 1 is a side elevation of an assembled liquid gage embodying the present invention.

Fig. 2 is a detail view of fragmentary parts of contiguous joints separated from each other.

Fig. 3 is a longitudinal sectional view of the valved liquid trapping head.

Fig. 4 is a transverse sectional view on line 4—4.

Fig. 5 is a perspective view of a flexible interconnecting linkage between succeeding sections or joints of the gage.

Fig. 6 is a side elevation thereof showing the operated position of the connection in dotted lines.

Fig. 7 is a side elevation of a succession of joints in disassembled folded relation.

Fig. 8 is a view of a lever device for more conveniently breaking the joints between sections.

Like parts are indicated by similar characters of reference throughout the several views.

The present gage device comprises an elongated tubular shaft 1 separable into sections or joints 2—2. The tubular shaft is formed of translucent material such that the level of the liquid within the tube may be easily observed. Such tubular shaft 1 may be of glass, but because of its fragile character and liability to breakage it is preferably of non-vitreous character such as molded phenolic condensation material or molded synthetic resinous products, of which there are several available upon the market, which are of transparent or of translucent character and will withstand quite considerable shock and rough usage without breaking.

The sections 2—2 are detachably connectable with each other by leak-tight joints. These may comprise screw thread couplings as shown in Fig. 2 or may be compression joints as illustrated in other figures of the drawing. At its lower end the translucent tubular shaft is provided with a metallic tubular head 5 forming an axial continuation of the shaft 1. The head 5 is counterbored to form therein internal spaced shoulders or seats 6, 7 and 8. On the shoulder 6 there is seated an annular valve seat 9 pressed into the head 5, which is engaged by a valve 10 under pressure of the spring 11. Seated on the respective shoulders 7 and 8 are perforated guide discs 12 and 13, also pressed tightly within the tubular heads 5 and through which extends a reciprocatory operator stem 14 having thereon a collar 15 which limits its outward movement. The stem 14 projects somewhat beyond the end of the head 5. When pressed against the bottom of a tank or reservoir, the stem is retracted and lifts the valve 10 from its seat against the yielding resistance of the spring 11. This permits liquid to freely enter through the head 5 into the tubular shaft 1 until it reaches therein the level of the contents of the tank. Upon raising the gage the valve immediately closes and traps the liquid in the tube, maintaining it at substantially its initial level therein. The head 5 is connected to the tubular stem 1 by a leak-tight compression joint 16. Such joint includes a collar 17 of packing material compressed by a gland or sleeve 18 having screw-threaded adjustment upon the head 5. The sections 2 are graduated as at 4 either in gallons, barrels or other units of liquid measurement, or such graduation may be merely arbitrary units of measurement, or they may be feet and inches. Obviously, knowing the diametrical or horizontal dimensions, and therefore the bottom area of a tank or reservoir, by multiplying such dimensions by the ascertained depth of the contents the volume thereof may be readily computed. Ordinarily a tank will be given an ascertained index or factor number, which multiplied by the arbitrary gage indication will give directly the volume in gallons or barrels as desired.

In lieu of the screw-threaded engagement of the sections with each other, thrust engagement under pressure is preferred as illustrated in Figs. 5, 6 and 7. In this form of detachable coupling, metallic sleeves or collars 20 are provided on the engaging ends of the sections 2. One of these sleeves or collars has a reduced extension 21 engageable within a corresponding counterbore in the companion coupling member. The collars or sleeves 20 are slotted at 22 to enable the entrapped liquid to be observed within the limits of the coupling.

The coupling sleeves 20 of adjacent sections are interconnected by interpivoted swinging links 23 and 24 which are in turn pivoted to the respective coupling members. The arrangement of swinging arms 23 and 24 provides a toggle link which is adapted to be adjusted slightly past dead center position to lock the parts in interengaged relation. These arms are arranged in pairs with one member of each pair on each side of the coupling. The shorter arms 24 are interconnected adjacent to their pivotal points with the links 24 by a transverse yoke 25, having therein a hole 26 for engagement of the downwardly bent end 27 of a lever 28. The protruding end 21 of the coupling collar on one tubular section is inserted in the receiving collar of the other section and the parts brought into aligned relation. By pressure upon the yoke 25, the toggle link assembly is thrust slightly beyond dead center position where the yoke contacts with the coupling to limit further relative movement. In this position the parts are drawn tightly into thrust engagement with each other. A suitable packing gasket is preferably positioned for compressive engagement between the coupling members. Upon being disengaged the respective sections may be folded in alternating reverse relation, as shown in Fig. 7, into a compact assembly for convenient transportation or storage.

The gager standing on top of a storage tank can engage and disengage successive sections or joints of the tubular gage as it is being lowered into and withdrawn from the tank. Thus, if the tank is deep, it is not necessary to extend the gage high in the air in either inserting it or removing it from the tank. After being thrust against the bottom of a tank and held sufficiently long to permit the tube to fill with liquid to the level of the contents of the tank, upon withdrawal of the gage the entrapped liquid will be retained therein until the level within the tube may be compared with the graduated scale thereon and the volume contents of the tank ascertained. The entrapped liquid is then permitted to drain back into the tank either as the successive sections are unjointed or by pressing the thrust stem against any convenient rest to unseat the valve.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A liquid gage of the pipette type wherein a quantity of liquid commensurate with that in the tank being measured is temporarily trapped in a tube for measured quantity indicating purposes, characterized by a plurality of tubular sections engageable one with another in continuous sequence, links flexibly interconnecting the gage tube sections and enabling the sections when disconnected to be folded into overlapping parallel relation, coupling means associated with the connecting links for axially adjusting the sections under pressure when interconnected into leak-tight relationship.

2. As an article of manufacture, an ullage rod including multiple independent sections of molded plastic material, interconnecting links flexibly connecting the sections for relative folding adjustment into compact overlapping assembly and coupling means associated with the interconnecting links for detachably interconnecting the sections into a continuous leak tight lineal succession when extended.

3. In an ullage rod, a succession of separable sections to be interconnected in lineal sequence, toggle links connecting the separable sections one with another and adapted to be adjusted beyond dead center relation when the sections are interengaged in assembled relation for temporarily locking the sections against disengagement, and an associated series of graduations for indicating a measured liquid depth into which the rod has been thrust.

4. In a folding ullage rod, a succession of separable sections to be interconnected in lineal sequence, pivotal sections interconnecting succeeding links one with another for relative swinging adjustment into and out of overlapping parallel folded relation, said links being arranged in pairs, the members of which extend in the same direction from their pivotal connection with the respective sections and are interpivoted to each other, said sections being axially adjustable under pressure into a rigid assembly by the toggle adjustment of the links into aligned relation and an associated series of graduations for indicating a measured liquid depth into which the rod has been thrust.

OLIVER WATSON.